US012651005B1

(12) United States Patent
Jones et al.

(10) Patent No.: US 12,651,005 B1
(45) Date of Patent: Jun. 9, 2026

(54) ZERO-DOWNTIME DATABASE UPGRADE

(71) Applicant: Micro Focus LLC, Wilmington, DE (US)

(72) Inventors: William M. Jones, Watertown, MA (US); Stephen Gregory Walkauskas, Pittsburgh, PA (US); Yuanzhe Bei, Watertown, MA (US); Alexander Kalinin, Watertown, MA (US)

(73) Assignee: Micro Focus LLC, Wilmington, DE (US)

( * ) Notice: Subject to any disclaimer, the term of this patent is extended or adjusted under 35 U.S.C. 154(b) by 0 days.

(21) Appl. No.: 18/972,836

(22) Filed: Dec. 7, 2024

(51) Int. Cl.
| | |
|---|---|
| *G06F 16/00* | (2019.01) |
| *G06F 8/656* | (2018.01) |
| *G06F 16/21* | (2019.01) |
| *G06F 16/27* | (2019.01) |

(52) U.S. Cl.
CPC .............. *G06F 16/27* (2019.01); *G06F 8/656* (2018.02); *G06F 16/212* (2019.01)

(58) Field of Classification Search
CPC ......... G06F 16/27; G06F 8/656; G06F 16/212
See application file for complete search history.

(56) References Cited

U.S. PATENT DOCUMENTS

| | | | |
|---|---|---|---|
| 2002/0035559 A1* | 3/2002 | Crowe ................ | G06F 16/2228 |
| 2022/0121455 A1* | 4/2022 | Hoban ................. | G06F 9/5027 |
| 2022/0137956 A1* | 5/2022 | Basavaiah ............... | G06F 8/656 |
| | | | 717/170 |
| 2023/0068439 A1* | 3/2023 | Hoeft ................... | G06F 16/2379 |
| 2023/0132690 A1* | 5/2023 | Wojcik ...................... | G06F 8/65 |
| | | | 717/170 |
| 2024/0354226 A1* | 10/2024 | Kalinin ............... | G06F 11/3698 |

FOREIGN PATENT DOCUMENTS

| | | | | |
|---|---|---|---|---|
| CN | 114285698 A | * | 4/2022 | |
| CN | 116431173 A | * | 7/2023 | ............... G06F 8/65 |
| CN | 117908904 B | * | 5/2024 | ........ G06F 9/45558 |
| CN | 119356719 A | * | 1/2025 | ............. G06F 16/27 |
| CN | 120104145 A | * | 6/2025 | |

* cited by examiner

*Primary Examiner* — Alexander Khong
(74) *Attorney, Agent, or Firm* — Sheridan Ross P.C.

(57) ABSTRACT

Systems, devices, and methods are disclosed to create a second subcluster in a sandbox, wherein the second subcluster corresponds to a first subcluster that requires an upgrade. The first subcluster is currently in use by a client executing an application. A second subcluster is created in a sandbox, which mirrors the first sandbox. The second subcluster is upgraded and, when complete, the first subcluster is paused, and state information is obtained from the first subcluster and copied to the second subcluster. Once the state information is uploaded to the second subcluster, communications between the client and database are set to use the second subcluster. As a result, the client experiences only a minor delay rather than any unavailability of the accessed databases.

20 Claims, 4 Drawing Sheets

ZERO-DOWNTIME DATABASE UPGRADE

FIELD OF THE DISCLOSURE

The invention relates generally to systems and methods for upgrading subclusters and particularly to upgrading subclusters while maintaining a connection of a client using a subcluster.

BACKGROUND

A database, such as the Vertica™ database by Open-Text™, may have a projection, which consists of a set of columns with the same sort order, defined by a column to sort by or a sequence of columns by which to sort. Like an index or materialized view in a traditional database, a projection accelerates query processing. When you write queries in terms of the original tables, the query uses the projections to return query results.

Projections are distributed and replicated across nodes in a cluster, ensuring that if one node becomes unavailable, another copy of the data remains available.

Subclusters form portions of a database and are used to segment clusters to isolate work. For example, a subcluster may be created to dedicate some nodes to loading data and other nodes to executing queries. In another example, subclusters may be created to allow one subcluster to be used by a dedicated group of users and another subcluster for a different group of users. Subclusters may be used to organize nodes into groups for easily scaling of a cluster up and down.

Primary subclusters form the core of a database. They are responsible for planning the maintenance of the data in the communal storage. A primary subcluster must always be running. If all primary subclusters shut down, your database shuts down because it cannot maintain the data in communal storage without a primary subcluster.

Usually, there is just a single primary subcluster in a database. There can be multiple primary subclusters. Additional primary subclusters can make a database more resilient to having primary nodes fail. However, additional primary subclusters make a database less scalable.

Secondary subclusters are designed for dynamic scaling. Secondary subclusters may be added, removed, started, or stopped based on analytic need as they are not essential for maintaining a database's data.

The nodes in the subcluster inherit their primary or secondary status from the subcluster that contains them; primary subclusters contain primary nodes and secondary subclusters contain secondary nodes.

SUMMARY

While the use of subclusters provides resilience and flexibility, subclusters may require upgrading, such as to add rows to a database table or modify a schema. Requiring an application to cease operations, perform the upgrade, and restart the application is cumbersome and inefficient as the application would become unavailable. For some systems that require continuous operation, such as airline reservations, health care, banking, etc., application downtime is avoided in all but the most urgent of circumstances. As a result, many needed upgrades are not applied.

In the prior art, the application would have prevented a subcluster from being able to be shut down. After the point of session transfer, any updates made to a subcluster would be lost unless the subcluster were put into a read-only mode, which again could cause application errors.

In the worst-case scenario, administrators wanting to free up the systems running subcluster nodes could force a shutdown of the subcluster, causing the application to abruptly show a fatal error.

These and other needs are addressed by the various embodiments and configurations of the present invention. The present invention can provide a number of advantages depending on the particular configuration. These and other advantages will be apparent from the disclosure of the invention(s) contained herein.

As a general introduction, and in one embodiment, systems and methods are provided herein for zero-downtime database upgrades. When a database upgrade is performed, the database application using the database is not disconnected.

In another embodiment, the systems and methods herein rely on Kubernetes, a well-known open-source platform for automating the deployment, scaling, and management of containerized applications. Kubernetes (often abbreviated as "K8") helps orchestrate clusters of machines to run containers efficiently and reliably. Kubernetes abstracts infrastructure details, enabling developers to focus on building applications while the system handles tasks like load balancing, scaling, and self-healing. Kubernetes abstracts infrastructure details, enabling developers to focus on building applications while the system handles tasks like load balancing, scaling, and self-healing. Key components include the primary node, which manages the system, and worker nodes that run application workloads. Kubernetes organizes containers into pods, which are the smallest deployable units, and groups them into services to ensure accessibility. Kubernetes is widely used in cloud-native environments, supporting hybrid and multi-cloud setups.

In another embodiment, a database application establishes a connection to a database(s) by specifying a network address and port that the database software is running on. The assumption is that the database software will continue to run while the application is connected. In the prior art, shutting down the database software is necessary to perform an upgrade; however, this will cause an error in the application.

Database software, such as Vertica™, runs on a collection of network addresses and ports. In Vertica™, the software that runs on each network address and port is called a node, and may be implemented as a K8 worker node. Subclusters are collections of nodes that work together to perform database operations. When upgrading the database, each subcluster may be upgraded independently of the other subclusters, a process known as sandboxing. Subclusters may also be added and removed independently of each other.

The two existing capabilities, sandboxing and the ability to add and remove subclusters, are the foundation of the embodiments herein. Additionally or alternatively, additional features include, in one embodiment, the ability for any node in a subcluster to initiate a session transfer, causing the current state of the session to be moved from one node to another and, in another embodiment, the implementation of a proxy to handle the session transfer for any compatible database client.

As a benefit of the proxy handling the session transfer, any existing client connected to the database does not need to be modified to handle session transfer. This is beneficial for several reasons, including but not limited to: the existing set of database clients do not need to be modified in order to support zero-downtime upgrade; it is not necessary for administrators to update to new versions of each client before doing a zero-downtime upgrade; the database is compatible with all earlier versions of database clients, going back to very early releases; many databases are accessed by legacy applications that include very old releases of the clients and cannot be upgraded to use newer client versions and the proxy allows those applications as well as the new clients to remain connected during database upgrades; and the database is also compatible with the wire protocol, such as is used by Postgres (see www.postgresql.org). This means that Postgres drivers are also able to connect to a Vertica™ database. The Vertica™ proxy also allows applications integrating to Vertica™ using a Postgres driver to experience zero-downtime when the database is upgraded.

In some aspects, the techniques described herein relate to a method, including: creating a second subcluster in a sandbox and wherein the second subcluster corresponding to a first subcluster, and wherein the first subcluster includes a connection to a client; upgrading the second subcluster; starting the second subcluster; and replicating second state values, associated with the first subcluster, to first state values, associated with the second subcluster.

In some aspects, the techniques described herein relate to a method, further including, redirecting the connection with the client to the second subcluster.

In some aspects, the techniques described herein relate to a method, further including, after the connection has been redirected to the second subcluster, closing a session with the first subcluster.

In some aspects, the techniques described herein relate to a method, further including, before replicating the second state values to the first state values, pausing the connection between the client and the first subcluster.

In some aspects, the techniques described herein relate to a method, wherein upgrading the second subcluster includes applying a schema to the second subcluster that is different from the schema of the second subcluster.

In some aspects, the techniques described herein relate to a method, wherein upgrading the second subcluster includes modifying at least one row of a table of the second subcluster that is different from at least one row of a table of the second subcluster.

In some aspects, the techniques described herein relate to a method, further including, after redirecting the connection with the client to the second subcluster, terminating the first subcluster.

In some aspects, the techniques described herein relate to a method, wherein the first subcluster and the second subcluster are each database clusters.

In some aspects, the techniques described herein relate to a method, wherein the first subcluster and the second subcluster are each a collection of nodes, each node including a network address and a Kubernetes node.

In some aspects, the techniques described herein relate to a system, including: a network interface to a network; and at least one microprocessor, each coupled to a computer memory having stored thereon instructions that, when read by any one or more of the at least one microprocessor, cause the at least one microprocessor to perform: creating a second subcluster in a sandbox and wherein the second subcluster corresponding to a first subcluster, and wherein the first subcluster includes a connection to a client; upgrading the second subcluster; starting the second subcluster; and replicating second state values, associated with the first subcluster, to first state values, associated with the second subcluster.

In some aspects, the techniques described herein relate to a system, wherein the instructions further cause the at least one microprocessor to perform redirecting the connection with the client to the second subcluster.

In some aspects, the techniques described herein relate to a system, wherein the instructions further cause the at least one microprocessor to perform redirecting, after the connection has been redirected to the second subcluster, closing a session with the first subcluster.

In some aspects, the techniques described herein relate to a system, wherein the instructions further cause the at least one microprocessor to perform, before replicating the second state values to the first state values, pausing the connection between the client and the first subcluster.

In some aspects, the techniques described herein relate to a system, wherein upgrading the second subcluster includes applying a schema to the second subcluster that is different from the schema of the second subcluster.

In some aspects, the techniques described herein relate to a system, wherein upgrading the second subcluster includes modifying at least one row of a table of the second subcluster that is different from at least one row of a table of the first subcluster.

In some aspects, the techniques described herein relate to a system, wherein the instructions further cause the at least one microprocessor to perform, after redirecting the connection with the client to the second subcluster, terminating the first subcluster.

In some aspects, the techniques described herein relate to a system, wherein the first subcluster and the second subcluster are each database subclusters.

In some aspects, the techniques described herein relate to a system, wherein the first subcluster and the second subcluster are each a collection of nodes, each node including a network address and a Kubernetes node.

In some aspects, the techniques described herein relate to a computer-readable memory including instructions that, when read by a microprocessor cause the microprocessor to perform: creating a second subcluster in a sandbox and wherein the second subcluster corresponding to a first subcluster, and wherein the first subcluster includes a connection to a client; upgrading the second subcluster; starting the second subcluster; and replicating second state values, associated with the first subcluster, to first state values, associated with the second subcluster.

In some aspects, the techniques described herein relate to a computer-readable memory, further including instructions to cause the microprocessor to perform redirecting the connection with the client to the second subcluster.

A system on a chip (SoC) including any one or more of the above aspects or aspects of the embodiments described herein.

One or more means for performing any one or more of the above or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects or aspects of the embodiments described herein, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1A:
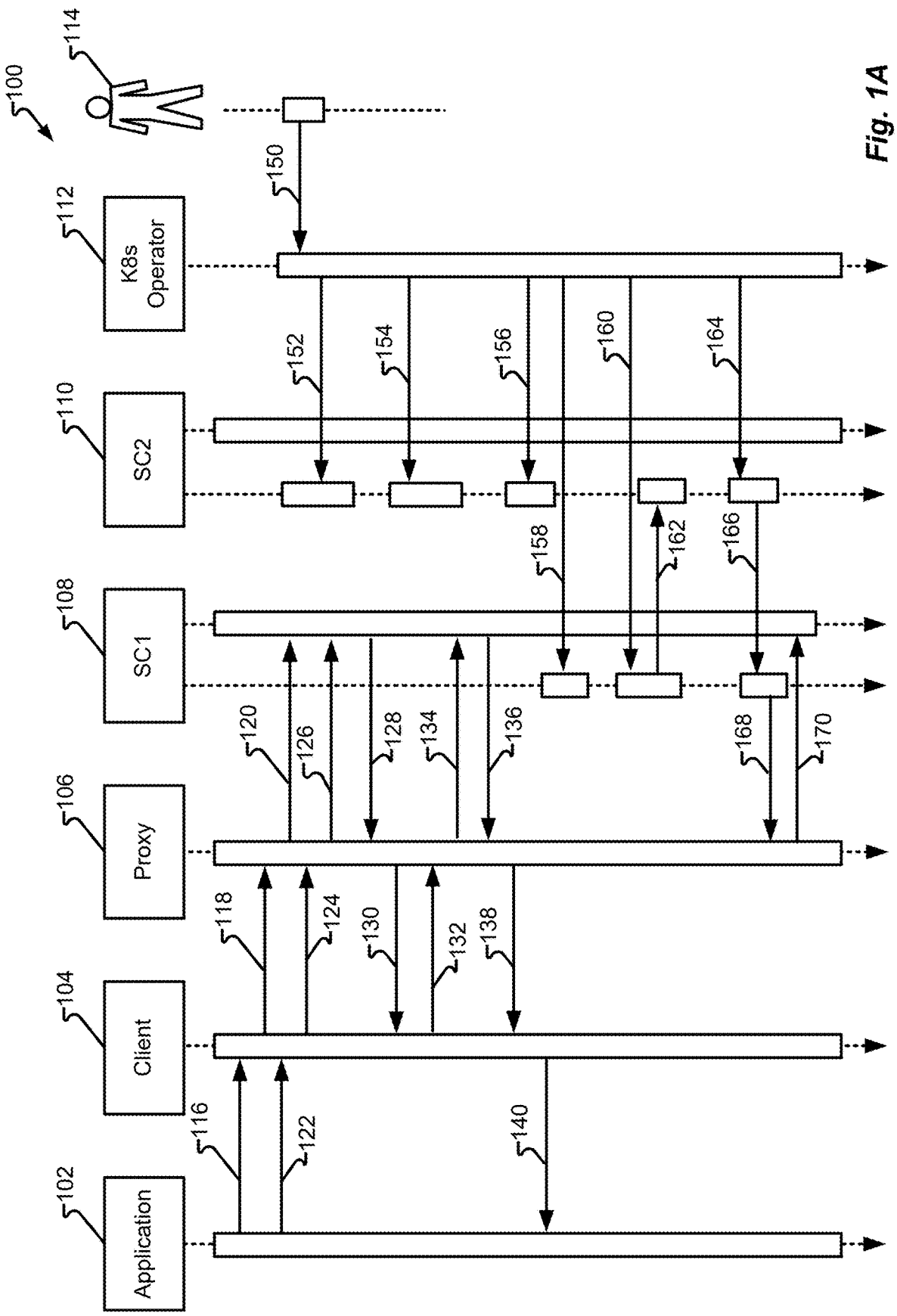
FIGS. 1A and 1B depict a process in accordance with embodiments of the present disclosure.
Figure 1B:
Figure 1B:
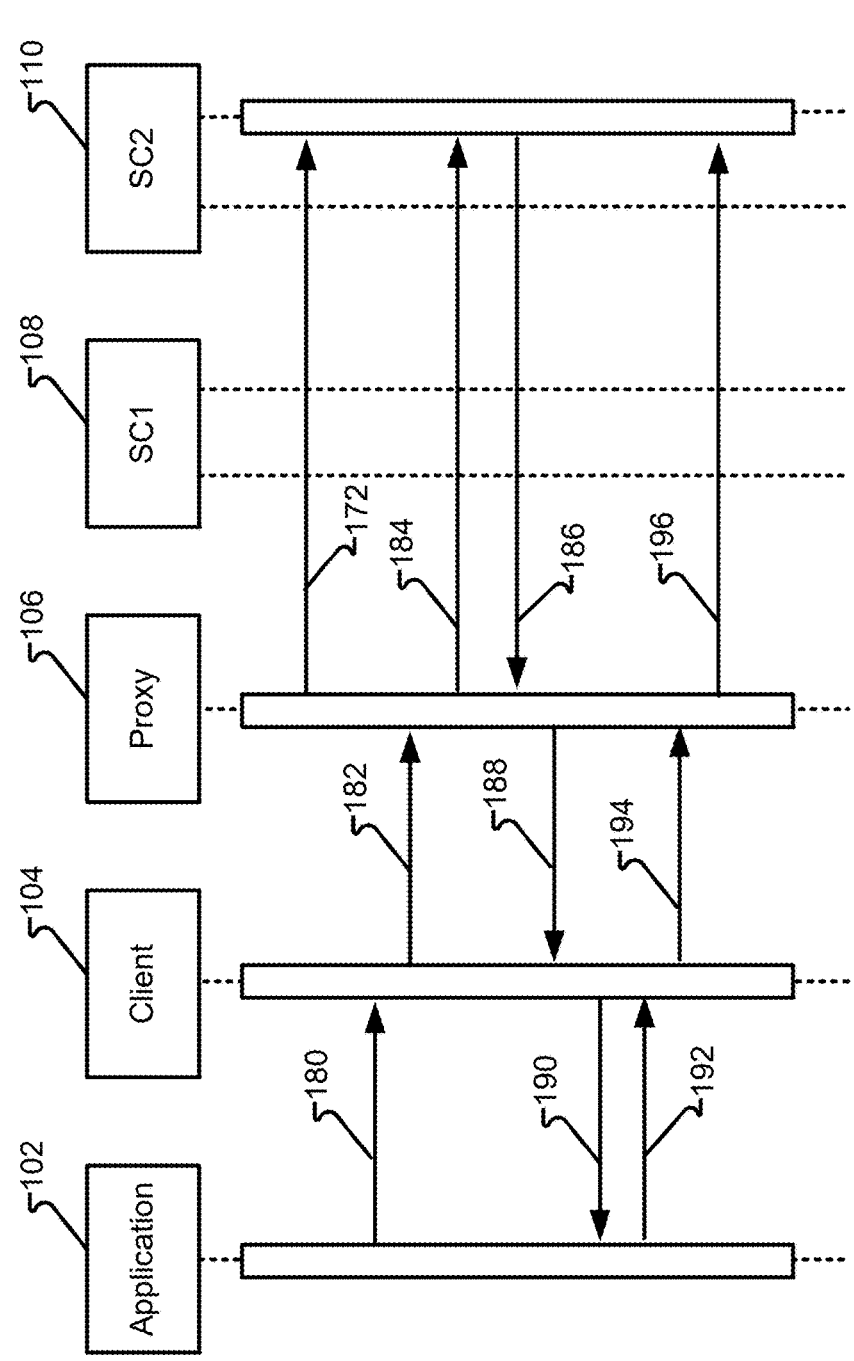

FIGS. 1A and 1B depict process 100 in accordance with embodiments of the present disclosure. In one embodiment, application 102 is executing on client 104, which requires data maintained in a database controlled by subcluster 1 ("SC1 (108)"). If SC1 (108) were to become inaccessible to application 102, application 102 would error. As a result, transactions or other records may become corrupted.

Application 102 may execute one or more operations (e.g., structured query language (SQL)), which are processed as message(s) between application 102, client 104, proxy 106, and SC1 (108). The number of such messages provided herein are for illustrative purposes only and those of ordinary skill in the art will appreciate that more or fewer messages may be required. More specifically, and in another embodiment, application 102 connects to client 104 with connect message 116. Connect message 116, received by client 104, sends connect session message 118 to proxy 106 and connects the session to SC1 (108) in response to connect message 120. Application 102 executes SQL commands via message 122, which the client passes as a front-end message 124 to proxy 106. Front end message 126 is then provided by proxy 106 to SC1 (108). In response, backend message 128 is provided by SC1 (108) to proxy 106 and, in turn, proxy 106 to client 104 in message 130. If additional messages are required, client 104 sends front end message 132 to proxy 106, which causes proxy 106 to send front end message 134 to SC1 (108) to obtain additional results. Results are provided by SC1 (108) in message 136 to proxy 106. In response, proxy 106 sends backend message 138 to client 104 and, in turn, results 140 are provided to application 102.

In another embodiment, user 114 is an administrator. Administrator 114 may be embodied as a human that initiates messages that are then executed by automatic means, such as by K8 operator 112, or as an entirely automated process wherein administrator 114 is a computer implemented user. Administrator 114 triggers upgrade 150, which is received by K8 operator 112. In response, K8 operator 112 sends three messages. Message 152 creates a sandbox of SC1 (108) on SC2 (110). Message 154 upgrades the sandbox of SC1 (108) executing on SC2 (110). The upgrade may include, but is not limited to, changing a database schema and adding rows to a table. Routine actions, such as writing or reading values in the database, are not, by themselves, an upgrade. Message 156 starts sandboxing of SC1 (108) executing on SC2 (110).

Pause message 158 pauses the client connection with SC1 (108). As a result, application 102 may find database queries are delayed (until after message 170), but such a delay is limited (e.g., a second or two) and does not trigger an error. Next, message 160 is sent by K8 operator 112 to replicate SC1 (108) to sandbox SC1 (108) executing on SC2 (110) and message 162 is sent by SC1 (108) to SC2 (110). Replication may include obtaining state information from SC1 (108) and setting the state values accordingly on sandbox SC1 (108) executing on SC2 (110). At this point, SC2 (110) is an upgraded version of SC1 (108) and operational to service database requests.

Next, message 164 is sent by K8 operator 112 to enable the connection to SC2 (110), which causes SC2 (110) to send redirect message 166 to redirect the connection to itself. Message 168 transfers the session from SC1 (108) to SC2 (110). Message 170 may then be sent to close the connection between proxy 106 and SC1 (108), and message 172 transfers the session to be between proxy 106 and SC2 (110).

As a result, and in another embodiment shown in FIG. 1B, application 102 executes SQL by sending message 180 to client 104, which is received by client 104, which sends front end message 182 to proxy 106. Proxy 106 sends front end message 184 to SC2 (110) (and not SC1 (108)), which causes backend message 186 to be sent back to proxy 106. Proxy 106 then sends backend message 188 to client 104, which sends results 190 to client 104. As will be appreciated by those of ordinary skill in the art, messages 180, 182, 184, 186, 188, and 190 may be repeated as needed. When application 102 is done, application 102 sends close message 192 to client 104, which causes client 104 to send a close session message 194 to proxy 106 and, in turn, close session message 196 is sent to SC2 (110).

Figure 2:
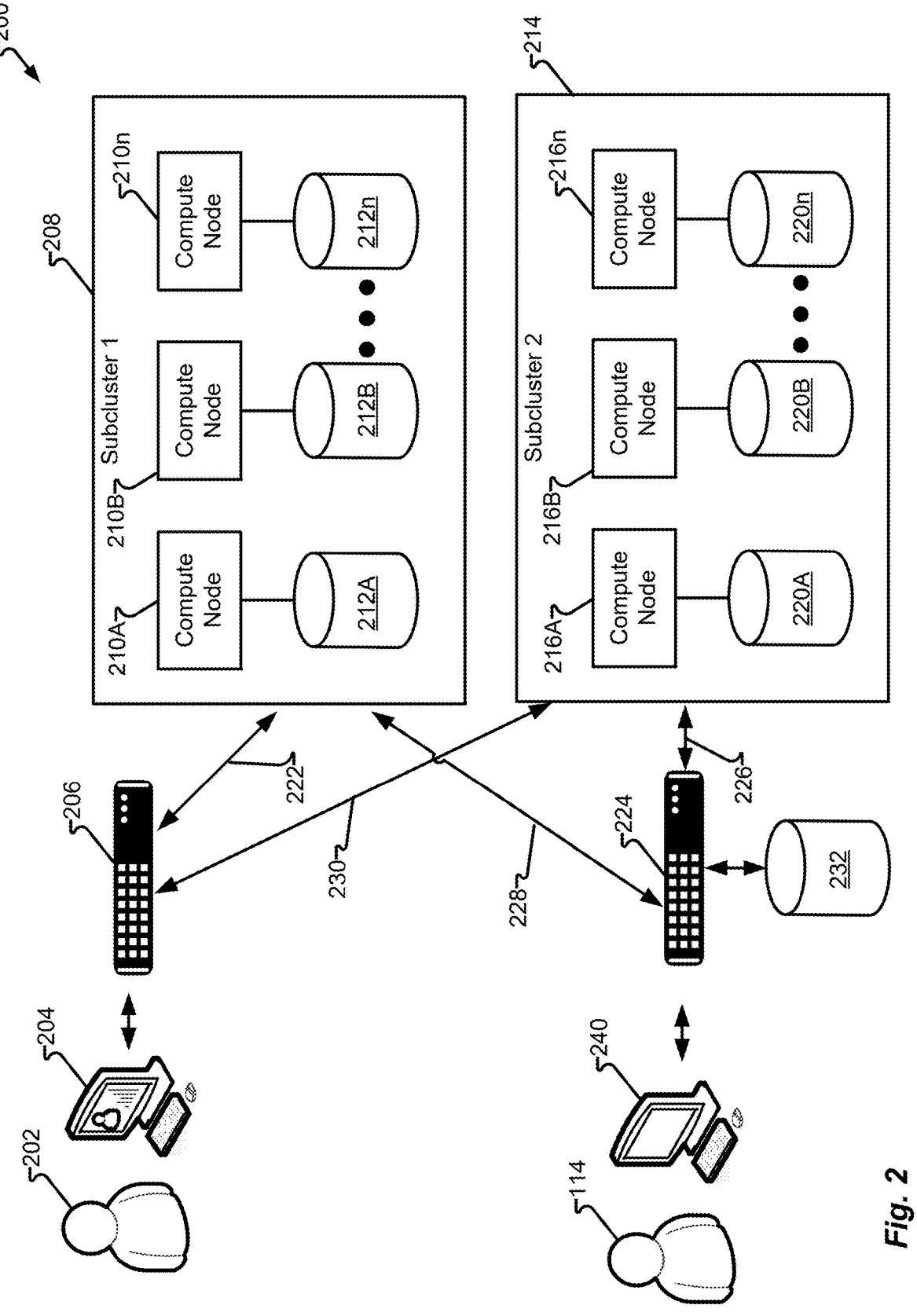
FIG. 2 depicts a system in accordance with embodiments of the present disclosure.

FIG. 2 depicts system 200 in accordance with embodiments of the present disclosure. In one embodiment, system 200 illustrates various computing components comprising computing components 204, 206, 224, 208, and 214, including a data storage component (e.g., data storage 232) interconnected, such as via a network (not shown). It should be appreciated by those of ordinary skill in the art that the embodiment illustrated is one example and that alternative topologies are contemplated herein without departing from the scope of the embodiments herein. For example, any single component may comprise a plurality of components and/or two or more components may be combined into a single component.

In one embodiment, client 204, which may be operated by user 202, is currently accessing data maintained on one or more of data storage 212 (e.g., data storage 212A, data storage 212B, . . . data storage 212n). Data storage 212A-n are accessed, in one topology, by a corresponding compute node 210 (e.g., compute node 210A, compute node 210B, . . . compute node 210n). As introduced above, other topologies are also contemplated including, but not limited to, topologies wherein two or more compute node(s) 210 may access a single database 212 and/or two or more databases 212 may be accessed by a single compute node 210.

Client 204, in one embodiment, is a client (e.g., client 104) executing an application (e.g., application 102). Server 206 may then execute a proxy (e.g., proxy 106) and, in other embodiments, the application. Server 206 accesses subcluster 208 in communication 222. Subcluster 208 may comprise data storage 212 that may require an upgrade. The upgrade may be to add rows to a table of a database stored thereon and/or change the database schema. Accordingly, administrator 114 may utilize computer 240 to cause server 224, which may execute a K8 operator (e.g., operator 112), to trigger an upgrade or other action that would otherwise require data storage 212 to fail to be accessible to client 204 while the upgrade takes place.

Server 224 may access upgrade or other information from data storage 232, in communication 228, and create subcluster 214 that reproduces compute node(s) 210 as compute node(s) 216 and data storage(s) 212 as data storage(s) 220 in operation 226. Subcluster 214 may be created in a sandbox of a server(s) for upgrading and/or other operations. Operation 226 may also provide any upgrades or other operational modifications to subcluster 214.

Server 224, in communication 228, obtains the latest state information and causes subcluster 208 to pause. Operation 226 further writes the state information obtained in communication 228 to subcluster 214. At this point subcluster 214 is an upgraded version of subcluster 208 and operation 226 and/or communication 228 may further cause server 206 to point to subcluster 214, via communication 230, and discontinue communication 222 to subcluster 208. As a result, subcluster 208 may be stopped and terminated as client 204 now interacts with the subcluster 214.

Figure 3:
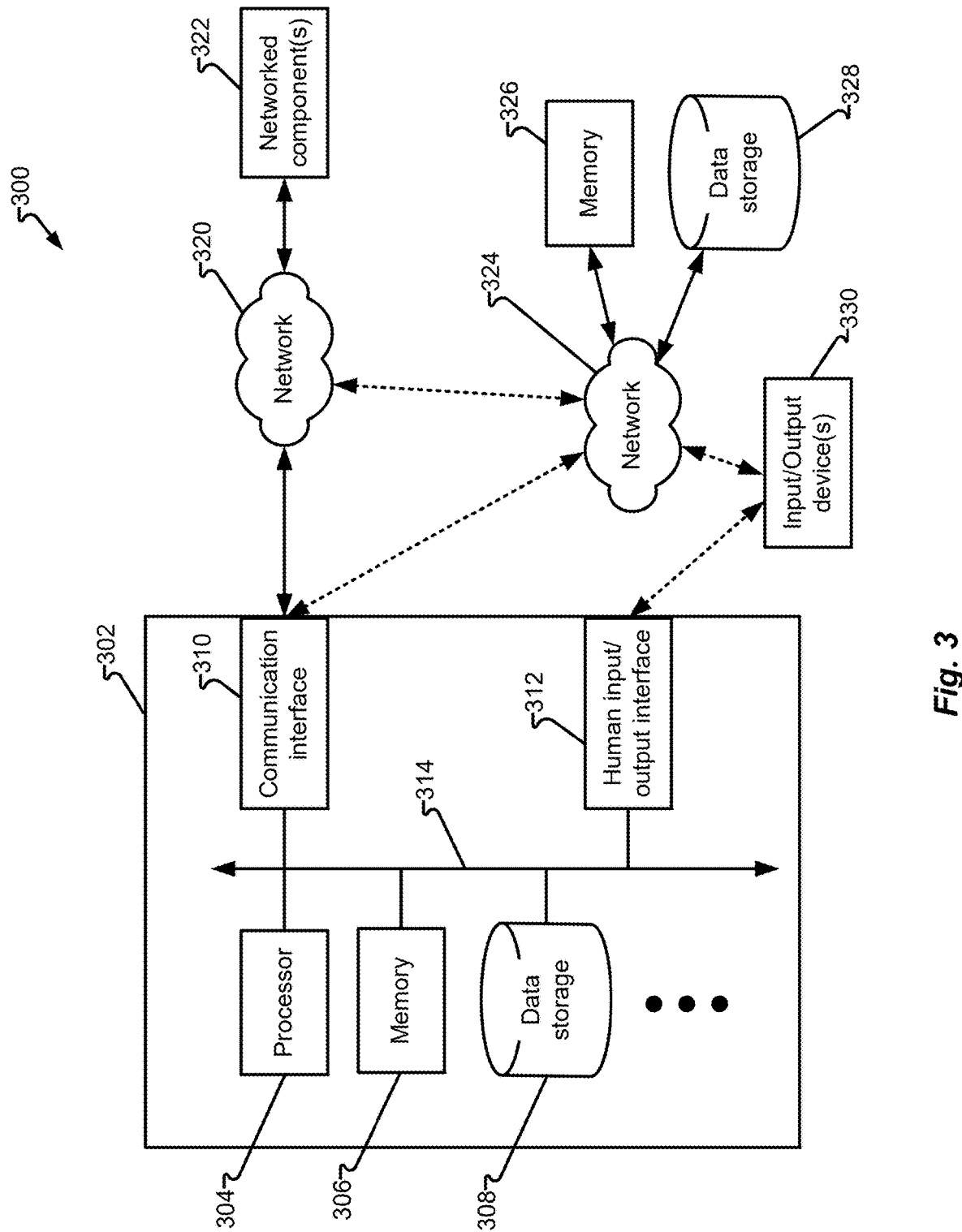
FIG. 3 depicts a device in a system in accordance with embodiments of the present disclosure.

FIG. 3 depicts device 302 in system 300 in accordance with embodiments of the present disclosure. In one embodiment, client 104, proxy 106, subcluster 108 (and/or components thereof), subcluster 110 (and/or components thereof), operator 112, client 204, server 206, server 224, subcluster 208 (and/or components thereof), and/or subcluster 214 (and/or components thereof) may be embodied, in whole or in part, as device 302 comprising various components and connections to other components and/or systems. The components are variously embodied and may comprise processor 304. The term "processor," as used herein, refers exclusively to electronic hardware components comprising electrical circuitry with connections (e.g., pin-outs) to convey encoded electrical signals to and from the electrical circuitry. Processor 304 may comprise programmable logic functionality, such as determined, at least in part, from accessing machine-readable instructions maintained in a non-transitory data storage, which may be embodied as circuitry, on-chip read-only memory, computer memory 306, data storage 308, etc., that cause the processor 304 to perform the steps of the instructions. Processor 304 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 314, executes instructions, and outputs data, again such as via bus 314. In other embodiments, processor 304 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 304 is a non-transitory computing device (e.g., electronic machine comprising circuitry and connections to communicate with other components and devices). Processor 304 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 304). Processor 304 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 304, device 302 may utilize computer memory 306 and/or data storage 308 for the storage of accessible data, such as instructions, values, etc. Communication interface 310 facilitates communication with components, such as processor 304 via bus 314 with components not accessible via bus 314 and may be embodied as a network interface (e.g., ethernet card, wireless networking components, USB port, etc.). Communication interface 310 may be embodied as a network port, card, cable, or other configured hardware device. Additionally or alternatively, human input/output interface 312 connects to one or more interface components to receive and/or present information (e.g., instructions, data, values, etc.) to and/or from a human and/or electronic device. Examples of input/output devices 330 that may be connected to input/output interface include, but are not limited to, keyboard, mouse, trackball, printers, displays, sensor, switch, relay, speaker, microphone, still and/or video camera, etc. In another embodiment, communication interface 310 may comprise, or be comprised by, human input/output interface 312. Communication interface 310 may be configured to communicate directly with a networked component or configured to utilize one or more networks, such as network 320 and/or network 324.

Network 320 may be a wired network (e.g., Ethernet), wireless (e.g., WiFi, Bluetooth, cellular, etc.) network, or combination thereof and enable device 302 to communicate with networked component(s) 322. In other embodiments, network 320 may be embodied, in whole or in part, as a telephony network (e.g., public switched telephone network (PSTN), private branch exchange (PBX), cellular telephony network, etc.).

Additionally or alternatively, one or more other networks may be utilized. For example, network 324 may represent a second network, which may facilitate communication with components utilized by device 302. For example, network 324 may be an internal network to a business entity or other organization, whereby components are trusted (or at least more so) than networked components 322, which may be connected to network 320 comprising a public network (e.g., Internet) that may not be as trusted.

Components attached to network 324 may include computer memory 326, data storage 328, input/output device(s) 330, and/or other components that may be accessible to processor 304. For example, computer memory 326 and/or data storage 328 may supplement or supplant computer memory 306 and/or data storage 308 entirely or for a particular task or purpose. As another example, computer memory 326 and/or data storage 328 may be an external data repository (e.g., server farm, array, "cloud," etc.) and enable device 302, and/or other devices, to access data thereon. Similarly, input/output device(s) 330 may be accessed by processor 304 via human input/output interface 312 and/or via communication interface 310 either directly, via network 324, via network 320 alone (not shown), or via networks 324 and 320. Each of computer memory 306, data storage 308, computer memory 326, data storage 328 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 330 may be a router, a switch, a port, or other communication component such that a particular output of processor 304 enables (or disables) input/output device 330, which may be associated with network 320 and/or network 324, to allow (or disallow) communications between two or more nodes on network 320 and/or network 324. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method, comprising:
creating a second subcluster in a sandbox, wherein the second subcluster corresponds to a first subcluster, and wherein the first subcluster comprises a connection to a client;
upgrading the second subcluster,
wherein upgrading the second subcluster comprises applying a schema to the second subcluster that is different from a schema of the first subcluster;
starting the second subcluster;
replicating first state values, associated with the first subcluster, to second state values, associated with the second subcluster; and
before replicating the first state values to the second state values, pausing the connection between the client and the first subcluster.

2. The method of claim 1, further comprising redirecting the connection with the client to the second subcluster.

3. The method of claim 2, further comprising, after the connection has been redirected to the second subcluster, closing a session with the first subcluster.

4. The method of claim 1, wherein upgrading the second subcluster comprises modifying at least one row of a table of the first subcluster.

5. The method of claim 2, further comprising, after redirecting the connection with the client to the second subcluster, terminating the first subcluster.

6. The method of claim 1, wherein the first subcluster and the second subcluster are each database subclusters.

7. The method of claim 1, wherein the first subcluster and the second subcluster are each a collection of nodes, each node comprising a network address and a Kubernetes node.

8. A system, comprising:
a network interface to a network; and
at least one microprocessor, each of which are coupled to a computer memory having stored thereon instructions that, when read by any one or more of the at least one microprocessor, cause the at least one microprocessor to perform:
creating a second subcluster in a sandbox, wherein the second subcluster corresponds to a first subcluster, and wherein the first subcluster comprises a connection to a client;
upgrading the second subcluster,
wherein upgrading the second subcluster comprises applying a schema to the second subcluster that is different from a schema of the first subcluster;
starting the second subcluster;
replicating first state values, associated with the first subcluster, to second state values, associated with the second subcluster; and
before replicating the first state values to the second state values, pausing the connection between the client and the first subcluster.

9. The system of claim 8, wherein the instructions further cause the at least one microprocessor to perform redirecting the connection with the client to the second subcluster.

10. The system of claim 9, wherein the instructions further cause the at least one microprocessor to perform redirecting the connection with the client to the second subcluster, after the connection has been redirected to the second subcluster, and closing a session with the first subcluster.

11. The system of claim 8, wherein upgrading the second subcluster comprises modifying at least one row of a table of the second subcluster.

12. The system of claim 8, wherein the instructions further cause the at least one microprocessor to perform, after redirecting the connection with the client to the second subcluster, terminating the first subcluster.

13. The system of claim 8, wherein the first subcluster and the second subcluster are each database clusters.

14. The system of claim 8, wherein the first subcluster and the second subcluster are each a collection of nodes, each node comprising a network address and a Kubernetes node.

15. A computer-readable memory comprising instructions that, when read by a microprocessor, cause the microprocessor to perform:
creating a second subcluster in a sandbox, wherein the second subcluster corresponds to a first subcluster, and wherein the first subcluster comprises a connection to a client;
upgrading the second subcluster,
wherein upgrading the second subcluster comprises applying a schema to the second subcluster that is different from a schema of the first subcluster;

starting the second subcluster;

replicating first state values, associated with the first subcluster, to second state values, associated with the second subcluster; and before replicating the first state values to the second state values, pausing the connection between the client and the first subcluster.

16. The computer-readable memory of claim 15, further comprising instructions to cause the microprocessor to perform redirecting the connection with the client to the second subcluster.

17. The computer-readable memory of claim 16, further comprising instructions to cause the microprocessor to perform redirecting the connection with the client to the second subcluster, after the connection has been redirected to the second subcluster, and closing a session with the first subcluster.

18. The computer-readable memory of claim 15, wherein upgrading the second subcluster comprises modifying at least one row of a table of the first subcluster.

19. The computer-readable memory of claim 15, wherein the first subcluster and the second subcluster are each database subclusters.

20. The computer-readable memory of claim 15, wherein the first subcluster and the second subcluster are each a collection of nodes, each node comprising a network address and a Kubernetes node.

* * * * *